(12) United States Patent
Dauer et al.

(10) Patent No.: US 8,873,222 B2
(45) Date of Patent: Oct. 28, 2014

(54) ELECTRIC PROTECTIVE SWITCHING DEVICE WITH CONTROL ELECTRONICS

(75) Inventors: Klaus Dauer, Koblenz (DE); Guenter Baujan, Troisdorf (DE); Anke Juelich, Niederkassel (DE)

(73) Assignee: Eaton Industries GmbH, Bonn (DE)

( * ) Notice: Subject to any disclaimer, the term of this patent is extended or adjusted under 35 U.S.C. 154(b) by 970 days.

(21) Appl. No.: 13/002,083

(22) PCT Filed: Jun. 19, 2009

(86) PCT No.: PCT/EP2009/004428
§ 371 (c)(1),
(2), (4) Date: Mar. 30, 2011

(87) PCT Pub. No.: WO2010/000394
PCT Pub. Date: Jan. 7, 2010

(65) Prior Publication Data
US 2011/0310521 A1  Dec. 22, 2011

(30) Foreign Application Priority Data
Jul. 2, 2008 (DE) .......... 10 2008 031 335

(51) Int. Cl.
| | |
|---|---|
| H02B 1/052 | (2006.01) |
| H02B 1/056 | (2006.01) |
| H01H 71/02 | (2006.01) |
| H01H 9/22 | (2006.01) |
| H01H 71/74 | (2006.01) |

(52) U.S. Cl.
CPC ... H01H 71/7409 (2013.01); *H01H 2071/7472* (2013.01); *Y02B 90/224* (2013.01); *Y04S 20/14* (2013.01); H01H 71/0228 (2013.01); *H01H 2300/03* (2013.01); H01H 9/22 (2013.01)
USPC ............. 361/600; 361/23; 361/601; 335/202; 335/132; 335/133

(58) Field of Classification Search
CPC ............ H01H 50/045; H01H 71/0207; H01H 71/1072
USPC ............. 361/23, 600, 601; 335/202, 132, 133
See application file for complete search history.

(56) References Cited

U.S. PATENT DOCUMENTS 3,962,658 A * 6/1976 Zunft et al. ................... 335/133
4,525,694 A * 6/1985 Dennison et al. ............. 335/132
(Continued)

FOREIGN PATENT DOCUMENTS

| CH | 319019 A | 1/1957 |
|---|---|---|
| DE | 3642719 A1 | 6/1988 |

(Continued)

*Primary Examiner* — Rita Leykin
(74) *Attorney, Agent, or Firm* — Leydig, Voit & Mayer, Ltd.

(57) ABSTRACT

An electric protective switching device is configured as a modular system and includes a switching device base module including first mechanical guide elements and an installation space with electric contacts. A control module including control electronics, first mechanical elements and electric counter-contact elements is installable into the installation space. A communication module including second mechanical elements is configured as an interface between the control electronics and an electronic bus system. The control module and the communication module are connectable mechanically and electrically to the switching device base module. The first mechanical guide elements of the switching device base module are configured to slidably receive the first mechanical elements of the control module and the second mechanical elements of the communication module in a plugging sequence wherein an electric contacting between the communication module and the control module is only established when, in the plugging sequence, the second mechanical elements of the communication module are connected to the first mechanical guide elements of the switching device base module before the first mechanical elements of the control module are connected to the first mechanical guide elements of the switching device base module.

12 Claims, 1 Drawing Sheet

(56) References Cited

U.S. PATENT DOCUMENTS

| | | | |
|---|---|---|---|
| 5,150,091 A * | 9/1992 | Hart et al. | 335/202 |
| 5,488,337 A * | 1/1996 | Hubbard et al. | 335/202 |
| 5,877,691 A | 3/1999 | Suptitz | |
| 6,294,889 B1 | 9/2001 | Briant | |
| 6,411,500 B1 * | 6/2002 | Kaaden et al. | 361/614 |
| 7,479,858 B1 | 1/2009 | Baurand | |
| 7,586,052 B2 * | 9/2009 | Adunka et al. | 200/293 |
| 7,586,395 B2 * | 9/2009 | Weister et al. | 335/172 |
| 8,085,527 B2 * | 12/2011 | Naumann et al. | 361/609 |
| 2009/0065338 A1 | 3/2009 | Baujan | |

FOREIGN PATENT DOCUMENTS

| | | |
|---|---|---|
| DE | 19515923 A1 | 11/1996 |
| DE | 19820667 A1 | 11/1998 |
| DE | 19924413 A1 | 11/2000 |
| DE | 10010290 A1 | 9/2001 |
| DE | 102006018852 B3 | 9/2007 |
| DE | 102006020702 A1 | 11/2007 |
| EP | 0843332 A1 | 5/1998 |
| WO | WO 0127958 A1 | 4/2001 |

* cited by examiner

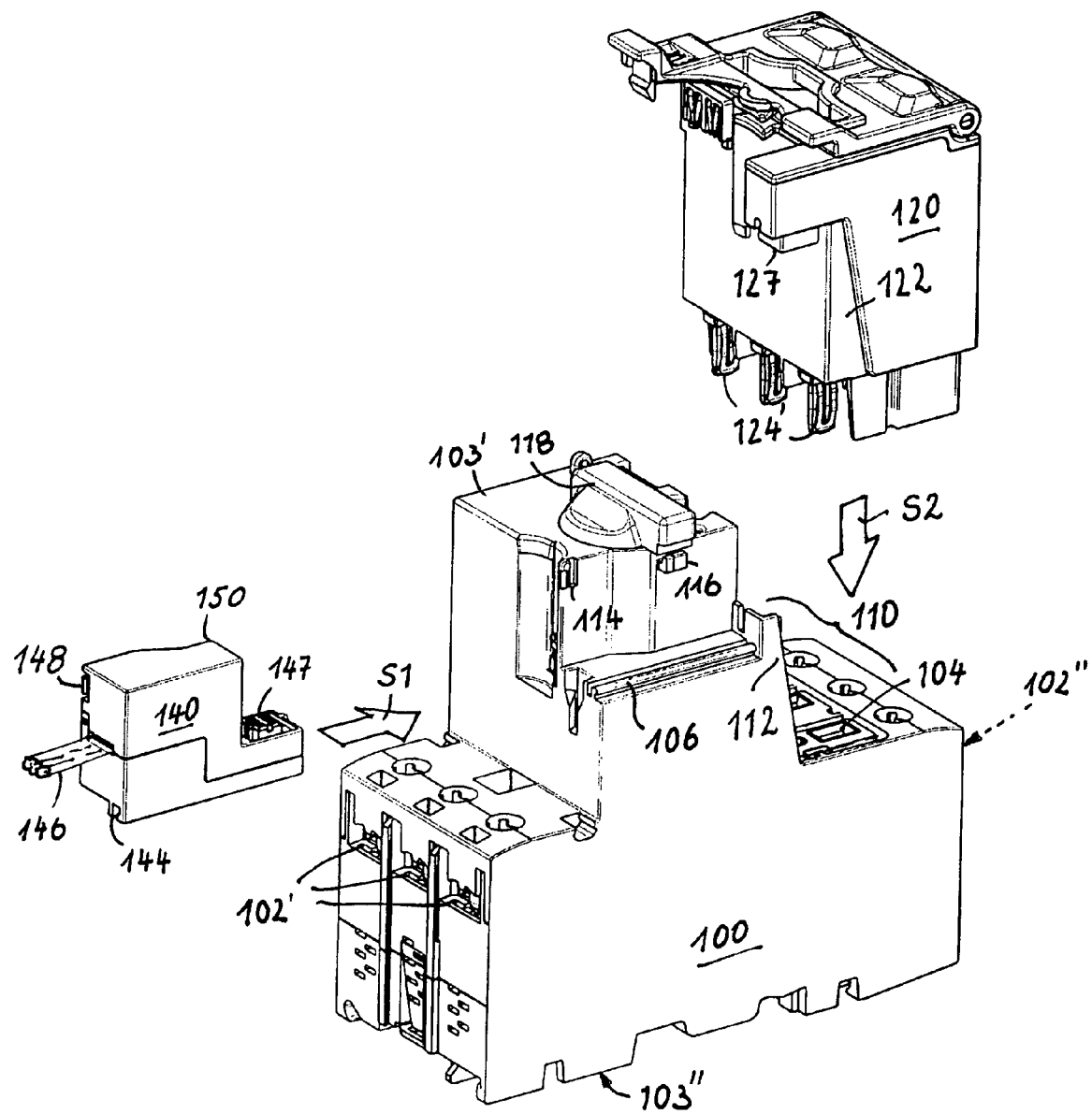

ELECTRIC PROTECTIVE SWITCHING DEVICE WITH CONTROL ELECTRONICS

CROSS-REFERENCE TO PRIOR APPLICATIONS

This application is a U.S. National Phase application under 35 U.S.C. §371 of International Application No. PCT/EP2009/004428, filed on Jun. 19, 2009, and claims benefit to German Patent Application No. DE 10 2008 031 335.1, filed on Jul. 2, 2008. The International Application was published in German on Jan. 7, 2010 as WO 2010/000394 A1 under PCT Article 21(2).

FIELD

The present invention relates to an electric protective switching device with control electronics, especially a motor starter of an electric motor, a circuit breaker or contactor to protect against thermal overload or short-circuit, whereby the control electronics can be networked with a bus system via an interface module and the interface module can be plugged via contacts.

BACKGROUND

Electric protective switching devices are known, especially as motor starters or motor circuit breakers, whose control electronics can be connected via a communication bus (for example, German patent applications DE 19820667 A1, DE 19924413 A1, DE 10010290 A1).

Other protective switching devices comprise essentially a base module, a manual actuation device, an electronic control unit, an actuator unit and a trigger. At least the switching mechanism is actuated with a manual actuation device via a knob and via an actuating shaft, whereby the actuating device is accommodated in a housing part that projects towards the front panel, and the actuating shaft is arranged perpendicular to the front panel. The knob protrudes from the front panel and can preferably be configured so that it can also be locked.

Examples of modular protective switching devices that are structured according to the modular principle have been described in German patent application DE 3642719 A1 or in international patent application WO 01-27958 A1. Another motor circuit breaker can also be fitted with a replaceable overcurrent release module (Swiss patent specification CH-PS 319019).

German patent application DE 195 15 923 A1 describes a protective switching device that can be expanded modularly by plugging in replaceable supplementary modules. The protective switching device has a prismatic housing part extending towards the front panel and, on this housing part, two connection surfaces and contact surfaces are formed perpendicular to the front panel. In this prior art, the supplementary modules can be plugged directly onto the protective switching device or else they are attached onto a substrate (support rail) separately from the protective switching device.

European patent specification EP 0843332 B1 describes a power breaker with a removable communication module.

SUMMARY

In an embodiment, the present invention provides an electric protective switching device that is configured as a modular system. The switching device includes a switching device base module including first mechanical guide elements and an installation space with electric contacts. A control module including control electronics, first mechanical elements and electric counter-contact elements is installable into the installation space. A communication module including second mechanical elements is configured as an interface between the control electronics and an electronic bus system. The control module and the communication module are connectable mechanically and electrically to the switching device base module. The first mechanical guide elements of the switching device base module are configured to slidably receive the first mechanical elements of the control module and the second mechanical elements of the communication module in a plugging sequence wherein an electric contacting between the communication module and the control module is only established when, in the plugging sequence, the second mechanical elements of the communication module are connected to the first mechanical guide elements of the switching device base module before the first mechanical elements of the control module are connected to the first mechanical guide elements of the switching device base module.

BRIEF DESCRIPTION OF THE DRAWINGS

The drawing illustrates an exemplary embodiment of the present invention. The invention is not limited to the exemplary embodiment. Other features and advantages of various embodiments of the present invention will become apparent by reading the following detailed description with reference to the attached drawing which illustrates the following:

FIG. 1 shows a perspective view of three elements of the modular system.

DETAILED DESCRIPTION

With such and similar protective switching devices of the prior art, it has been determined that it is a drawback that they can be modularly assembled and disassembled irrespective of whether the protective switching device is in the ON position or not.

The present invention, in an embodiment, allows a protective switching device to be modularly assembled with at least one replaceable communication module, and includes a safety function that only allows replacement when the protective switching device is in the OFF state.

An embodiment of the present invention includes an electric protective switching device configured as a modular system and having a communication module that is removable and that interacts with a control module, but that can only be taken off when the protective switching device has been switched off.

Consequently, an embodiment of the present invention provides that the first mechanical guide elements on the switching device base module, the associated mechanical elements on the control module, and the associated mechanical elements on the communication module are configured in such a way that an electric contacting between the communication module and the control module is only established when, in the plugging sequence, the communication module is first mechanically connected to the switching device base module, and then the control module is plugged onto the switching device base module and onto the communication module. The pluggable communication module is configured as an interface between the control electronics and an electronic bus system.

Different first mechanical guide elements can be configured on the pluggable modules. For example, these first mechanical guide elements can be in the form of a tongue and groove, and furthermore, configurations such as a slot and key or recesses that correspond with each other can be used. In particular, the installation space in the switching device base module is equipped with second mechanical guide elements that can be part of an insertion shaft. Moreover, the plug contacts between the control module and the switching device base module are configured to be mechanically precise, so that they are mechanically guided and held in place once the plug openings are found.

On the communication module, a snap-type hook can be configured that, in the plugged final position of the communication module on the switching device base module, engages into a corresponding hook and establishes a detachable connection with it. The snap-type hook can be configured as a film hinge on the communication module, and can be released from the latch with a small tool, optionally also by hand, so that the communication module is securely held on the switching device base module.

On the switching device base module, a catching tab can be configured that corresponds to an associated housing formation on the communication module. As a result, the mechanical stability between the switching device base module and the communication module is not only provided by the tongue and groove connection, but an improved fixation of the two parts is achieved with these additional mechanical elements.

The electric line (bus line) to create the connection between the communication module and the bus system should be undetachbly contacted to the communication module.

The communication module itself can also comprise an electronic module that is configured as a replaceable electronic chip and that serves, for instance, to store addresses.

The electric contact means between the communication module and the control module can be in the form of commercially available plug systems such as, for example, RJ45 plug systems.

When work is done on an electric system protected with the device or on an electric motor that is to be protected, it should be possible to disconnect the module, especially by pulling out the control module. In this manner, the system or the electric motor is de-energized, and a visible disconnection point is formed, and the wiring run is safely interrupted.

Here, the openings for the plug contacts in the switching device base module should be configured so as to be safe against finger touch and thus protected against being accidentally touched.

Preferably, in one embodiment of the protective switching device, an apparatus can be present for applying a lead seal onto one of the modules that can be plugged onto the switching device base module. By applying a lead seal onto the control module with the switching device base module, the removal of the communication module is also indirectly prevented.

The control electronics used with the protective switching device according to an embodiment of the present invention entails the advantage of a base device with which functions can be easily and reliably established or, if necessary, the values of said device can be changed. Power can be supplied to the control electronics from the main circuit of the protective switching device, so that the control electronics are always active when the protective switching device and the downstream consumer(s) is/are conducting current. The control electronics can be adjusted to certain control variables in a fault scenario when the protective switching device has to switch off. Preferably, also an operator can change the settings of different control variables by using knobs that can be accessed from the outside. As control variables, primarily the inertia of the disconnection and a fault current that exceeds a certain rated current are preset and/or adjustable. Such fault current criteria are also covered by international standards (EN 60947), where, for example, tripping times are associated with different groups of rated currents.

The actuator unit including the trigger (trigger block) can be an integral part of the electronic control module. Therefore, the control module and the trigger block together form a pluggable module. Combining them is advantageous because the trigger block itself is configured in such a way that it has control functions, and thus the communication function is combined with the switch control in one component.

When a fault occurs, the control electronics of the actuator unit or of the trigger block actuates the switching mechanism, which causes the contacts of the main circuit to open. The core of the actuator unit is an energy storage apparatus in the switching device base module, and this energy storage apparatus brings about the accelerated actuation of the breaker latching mechanism. The protective switching device comprises a short-circuit instantaneous release that likewise acts on the switching mechanism via a mechanical operative connection.

The protective switching device with the described base module forms a base device with which the customer/operator can preset and/or change individual functional features by replacing the control electronics or the control module that is integrated into the trigger block. Other individual components can also be plugged into or onto the switching device base module, or can be assembled with the protective switching device in some other manner.

FIG. 1 shows a perspective view of three elements of the modular system. The invention relates to a protective switching device that is an integral part of a pluggable switch combination whose components are configured as a modular system. The constituents of the module are, to the extent that this is relevant for the present application: a switching device base module 100, a control module 120 and a communication module 140. Mechanical guide elements and electric contact means (plug contacts, jacks) are present in order to plug the parts of the modular system.

The bottom 103" of the switching device base module 100 serves primarily for attachment onto a substrate, for example, onto a support rail, in contrast to which its top 103', as the front panel for the operator, is configured especially with an actuation knob and with display means.

The switching device base module 100 comprises multiphase main circuits running between the input contacts and the output contacts (102', 102"), essentially a contact apparatus (not shown here), a breaker latching mechanism (not shown here), and a manual actuation device 118 for the protective switching device. The switching device base module 100 also comprises an actuator unit as a clamping unit and actuation unit for the breaker latching mechanism.

As mentioned, there are protective switching devices with which a trigger block is present in a base module, or with which a trigger block is arranged on a base module so as to be pluggable (removable). In modern protective switching devices, the trigger block comprises electronic control electronics. The control electronics is the center of the control unit. Input and measuring signals, as parameters or acquired data of the current flowing through the main circuit, are supplied to the control electronics via current transformers. The control unit is set to certain control variables in a fault scenario when the protective switching device has to switch off.

A prismatic installation space 110 is formed on the switching device base module 100 by means of a housing recess into which the control module can be slid and electrically connected to the switching device base module 100. The electric contact means consist of plug-in fingers 124 on the control module and of sockets 104 on the switching device base module. As parts of the insertion shaft, housing wall parts 112 can be formed on the switch housing, so that here, additional mechanical guide elements are present for purposes of securely inserting the control module. The insertion direction is indicated in the figure by the arrow S2, and runs perpendicular to the surface 103' of the switching device base module 100. The core of the invention is that the communication module cannot be removed from the assembly as long as the control module is in its plugged position. This ensures that the communication between the control electronics and the electronic bus system can only be interrupted once the control module has been removed from the switching device base module 100. This should only be possible according to the invention when the function of the protective switching device has been switched to the OFF position.

While the invention has been particularly shown and described with reference to preferred embodiments thereof, it will be understood by those skilled in the art that various changes in form and details may be made therein without departing from the spirit and scope of the invention.

REFERENCE NUMERALS

- 100 switching device base module
- 102', 102" contacts of the main circuit
- 103', 103" top, bottom
- 104 contacts to the control module
- 106 first mechanical guide elements (groove)
- 110 installation space
- 112 second mechanical guide elements (insertion shaft, guide)
- 114 hook
- 116 catching tab
- 118 actuation knob
- 120 control module; integrated into the trigger block
- 122 guide
- 124 contacts to the switching device base module, plug-in fingers
- 127 plug (contacts)
- 140 communication module
- 146 bus line
- 144 tongue (for the groove)
- 147 socket connector (contacts)
- 148 film hinge, snap-type hook
- 150 hook
- S1 plugging the communication module onto the base module
- S2 plugging the control module onto the base module

The invention claimed is:

1. An electric protective switching device configured as a modular system, comprising:
    a switching device base module including first mechanical guide elements and an installation space with electric contacts;
    a control module including control electronics, first mechanical elements and first and second electric counter-contact elements, the control module being installable into the installation space; and
    a communication module including second mechanical elements, the communication module being configured as an interface between the control electronics and an electronic bus system,
    wherein the control module and the communication module are connectable mechanically and electrically to the switching device base module, the first electric counter-contact elements being configured for contacting with the switching device base module, the second electric counter-contact elements being configured for contacting with the communication module, and
    wherein the first mechanical guide elements of the switching device base module are configured to slidably receive the first mechanical elements of the control module and the second mechanical elements of the communication module in a plugging sequence so that an electric contacting between the communication module and the control module is only established when, in the plugging sequence, the second mechanical elements of the communication module are connected to the first mechanical guide elements of the switching device base module before the first mechanical elements of the control module are connected to the first mechanical guide elements of the switching device base module.

2. The electric protective switching device according to claim 1, wherein the switching device includes a motor starter of at least one of an electric motor and an electric contactor.

3. The electric protective switching device according to claim 1, wherein the installation space of the switching device base module includes second mechanical guide elements.

4. The electric protective switching device according to claim 1, wherein the first mechanical guide elements and the corresponding first and second mechanical elements are respectively configured as tongue and groove elements.

5. The electric protective switching device according to claim 1, further comprising a trigger block that is integral with the control module and pluggable therewith in the plugging sequence.

6. The electric protective switching device according to claim 1, wherein the communication module includes a snap-type hook configured to detachably connect with a corresponding hook on the switching device base module in a plugged final position of the plugging sequence.

7. The electric protective switching device according to claim 6, wherein the snap-type hook includes a film hinge.

8. The electric protective switching device according to claim 1, wherein the switching device base module includes a catching tab configured to catch an associated housing formation on the communication module in the plugging sequence.

9. The electric protective switching device according to claim 1, wherein an electric line is undetachably connected to the communication module and connects the communication module and the bus system.

10. The electric protective switching device according to claim 1, wherein the communication module includes an electronic module.

11. The electric protective switching device according to claim 1, wherein the electric contacting between the communication module and the control module is provided by respective electric contact elements configured as an RJ45 plug system.

12. The electric protective switching device according to claim 1, wherein at least one of the control module and the communication module includes a sealing apparatus configured to apply a lead seal onto the at least one of the control module and the communication module after being plugged into the switching device base module.

* * * * *